United States Patent [19]

Tatom et al.

[11] Patent Number: 5,801,636
[45] Date of Patent: Sep. 1, 1998

[54] METHOD AND APPARATUS FOR SEISMIC TORNADO DETECTION

[76] Inventors: Frank B. Tatom, 3062 Dupree Dr., Huntsville, Ala. 35801; Stanley J. Vitton, 329 Mason Ave., Hancock, Mich. 49930

[21] Appl. No.: 779,494

[22] Filed: Jan. 8, 1997

[51] Int. Cl.$^6$ .................................................. G08B 21/00
[52] U.S. Cl. .................. 340/690; 340/601; 73/170.16; 73/170.24; 73/DIG. 1; 33/1 HH
[58] Field of Search ......................... 340/601, 690; 73/170.16, 170.24, DIG. 1; 33/1 HH

[56] References Cited

U.S. PATENT DOCUMENTS

| | | | |
|---|---|---|---|
| 4,300,135 | 11/1981 | Korn et al. | 340/690 |
| 4,689,997 | 9/1987 | Windisch | 340/690 |
| 5,101,195 | 3/1992 | Caillat et al. | 340/690 |
| 5,379,025 | 1/1995 | Tatom et al. | 340/601 |
| 5,625,348 | 4/1997 | Farnsworth et al. | 340/690 |

*Primary Examiner*—Jeffery Hofsass
*Assistant Examiner*—Sihong Huang
*Attorney, Agent, or Firm*—John C. Garvin, Jr.; Harold W. Hilton

[57] ABSTRACT

A tornado warning system having means for monitoring seismic waves of a predetermined frequency range including long-period seismic waves and short-period seismic waves. The seismic waves are associated with and produced in the ground as a result of an approaching tornado. The warning system comprises means for detecting the seismic waves including the long-period seismic waves and the short-period seismic waves and for providing an electrical output indicative thereof. Circuit means are provided for processing the electrical output to provide an output signal indicative of the long-period seismic waves and the short-period seismic waves. Alarm means are provided for receiving the output signal from the circuit means to generate an alarm to warn of the presence of a tornado.

17 Claims, 5 Drawing Sheets

METHOD AND APPARATUS FOR SEISMIC TORNADO DETECTION

TECHNICAL FIELD

The present invention relates generally to method and apparatus for providing a warning of an approaching tornado and more specifically to method and apparatus for detecting seismic vibrations produced by a tornado, and sounding an alarm to warn the occupants of the building where the invention is installed.

BACKGROUND OF THE INVENTION

It is well known that considerable kinetic energy is contained in a tornado. The magnitude of the stored kinetic energy will vary, depending on the intensity of the tornado. Whenever in contact with the ground, a tornado encounters considerable frictional resistance. In overcoming such resistance and in interacting with the ground through turbulent pressure fluctuations the tornado transfers a considerable amount of energy into the ground. A significant portion of the energy absorbed by the ground takes the form of seismic waves or vibrations, with the remainder being transformed into thermal energy.

U.S. Pat. No. 5,379,025 entitled "Method And Apparatus For Seismic Tornado Detection" issued on Jan. 3, 1995 to the inventors of the present system discloses and claims the method and apparatus for seismic tornado detection utilizing input data derived from seismic surface waves of predetermined frequencies in the 5–60 hz range. Such surface waves are classified as "short-period" waves. However, it has been found since the issuance of U.S. Pat. No. 5,379,025, that while the apparatus and method of said patent is well suited for purposes described therein, the apparatus and method fails to take into consideration "long-period seismic waves" which are also generated by tornadoes. Accordingly, the present invention is an improvement over U.S. Pat. No. 5,379,025 and is directed to apparatus and method for detecting not only the short-period seismic surface wave disclosed in U.S. Pat. No. 5,379,025 but also newly discovered long-period waves. U.S. Pat. No. 5,379,025 is incorporated herein by reference.

The reduced mean static pressure associated with the passage of a tornado over the ground surface produces a deformation in the Earth's crust. This deformation is known as tilt. Since tilt (deformation of the Earth's surface) generated by tornadoes varies with time, it can also be observed as long-period seismic waves recorded by seismographs. The frequency associated with the long-period waves may range from 0 to 0.01 hz, with 0.001 hz as typical. Both short-period seismic surface waves and the long-period seismic waves will be referred to as seismic waves.

Long-period seismic waves accompanying tornadic activity are a newly discovered phenomena that became apparent when a recent seismogram revealed such long-period waves after a tornado had passed a region in which a seismograph was in operation.

It is an object of the present invention to provide an apparatus and method for seismic detection of tornadoes.

It is a further object of the present invention to provide such apparatus and method with means to detect both tornadic induced long-period seismic waves and also short-period seismic waves.

It is yet another object of the present invention to provide such apparatus and method with warning means to warn of the existence of tornadic activity in the vicinity of the detector.

SUMMARY OF THE INVENTION

The invention, which is designated by the abbreviation STD (Seismic Tornado Detector), relates to both the method and apparatus for detecting and providing a timely warning of approaching tornadoes that are in contact with the ground.

The STD equipment, includes detectors for detecting both short-period and long-period seismic waves. The detectors are connected to a microchip, which in turn is connected to an alarm. The microchip contains an analog-to-digital (A/D) converter, a band-pass filter, a low-pass filter, three signal-to-noise comparators, and a switch. The alarm, when activated, provides an audio or visual signal, which warns the occupants of the building where the STD is installed.

BRIEF DESCRIPTION OF THE INVENTION

DETAILED DESCRIPTION OF THE INVENTION

Figure 1:
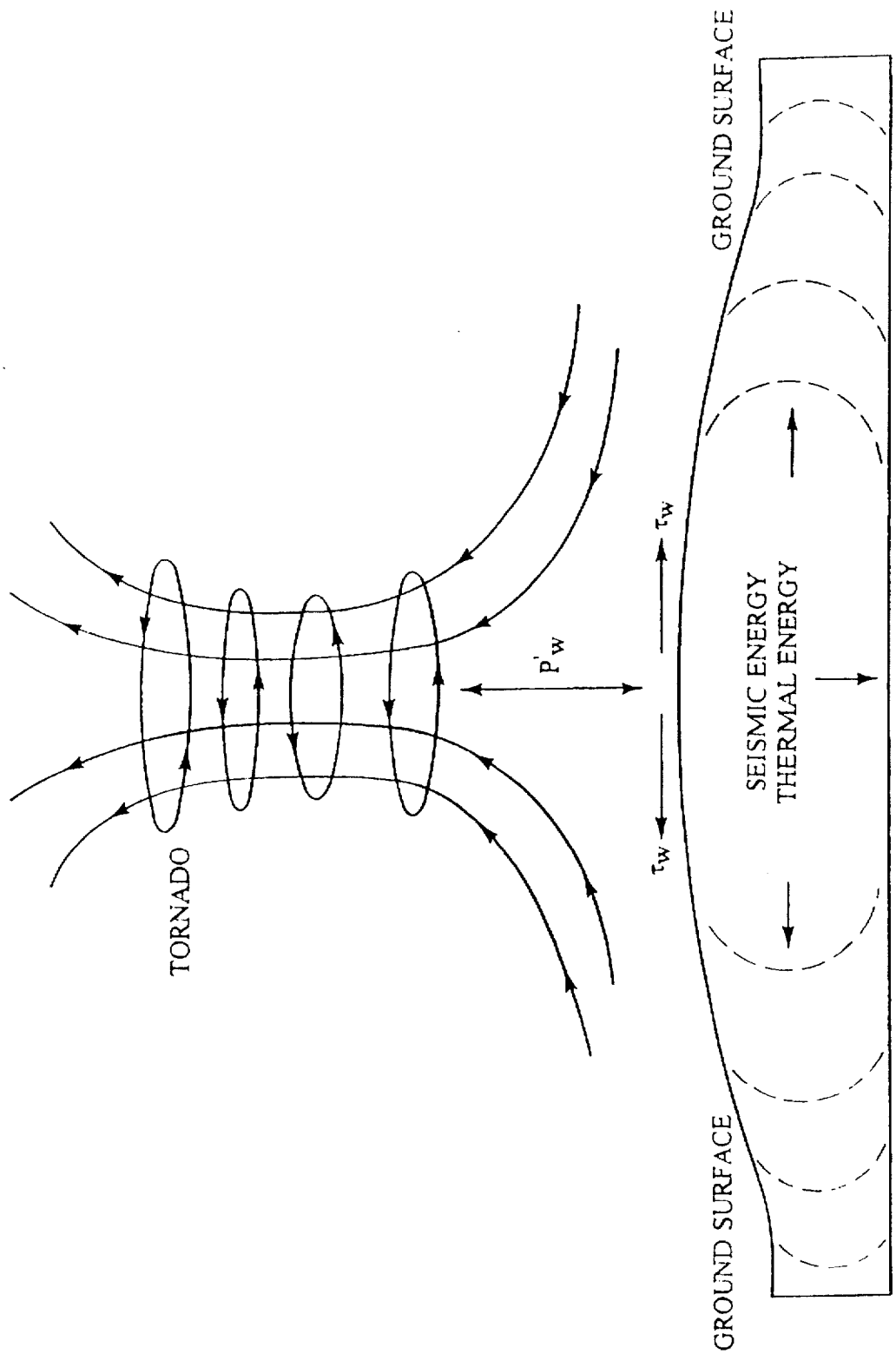
FIG. 1 is a diagrammatic illustration of a typical tornado-ground interaction wherein $P_w$ indicates turbulent vertical pressure fluctuations and $\tau_w$ indicates turbulent shear stresses.

FIG. 1 is an illustration of the seismic waves generated and the energy transferred into the ground when a tornado engages the ground. Seismic surface waves generally are divided into Love waves, which are SH-type waves, and Rayleigh waves which are a combination P-type and SV-type waves. Because of the nature of the Earth's surface the Love waves tend to be secondary, and thus the Rayleigh waves are the primary seismic signal generated by tornadoes. The P-type Rayleigh wave is also referred to as the horizontal component of the Rayleigh wave, while the SV-type Rayleigh wave is referred to as the vertical component of the Rayleigh wave. Tornado seismic variations (TSV) includes these Rayleigh waves and propagate radially outward from the tornado as depicted in FIGS. 1 and 2.

Figure 2:
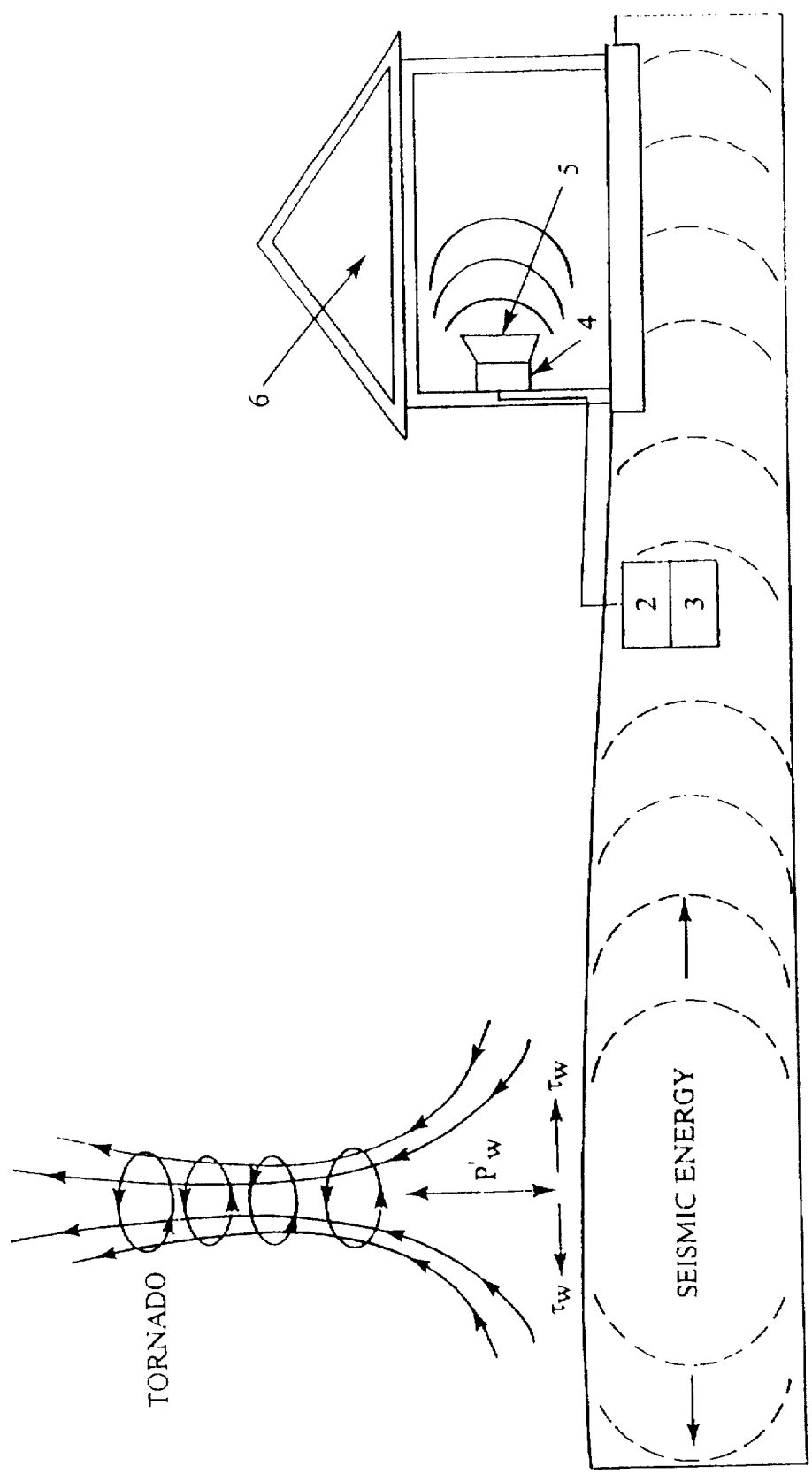
FIG. 2 is a diagrammatic illustration of the warning system of the present invention in conjunction with a building that is in the vicinity of a tornado.
Figure 4A:
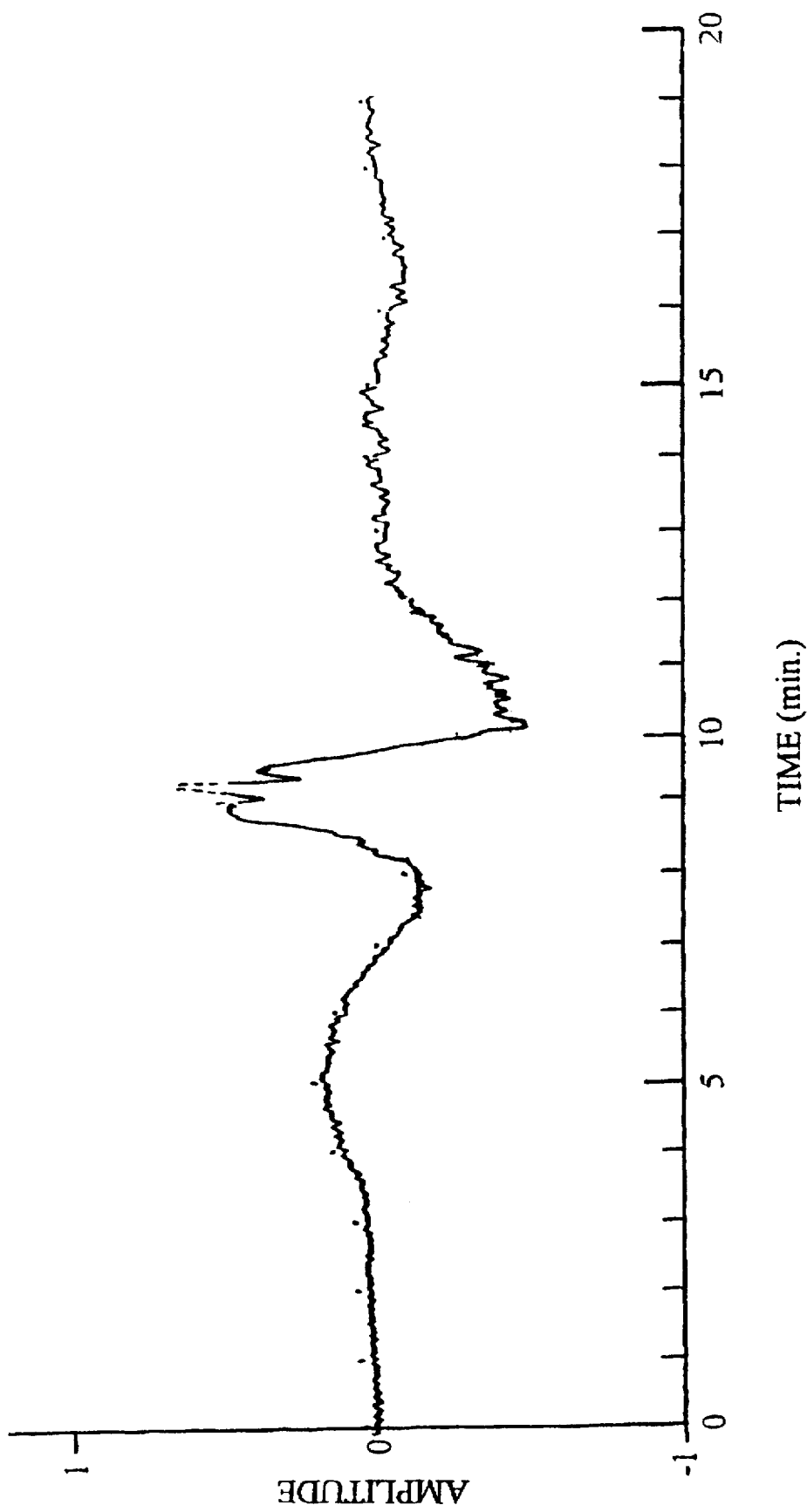
FIG. 4a is a diagrammatic illustration of long-period waves and FIG. 4b is a diagrammatic illustration of short-period waves detectable by the apparatus and method of the present invention.
Figure 4B:
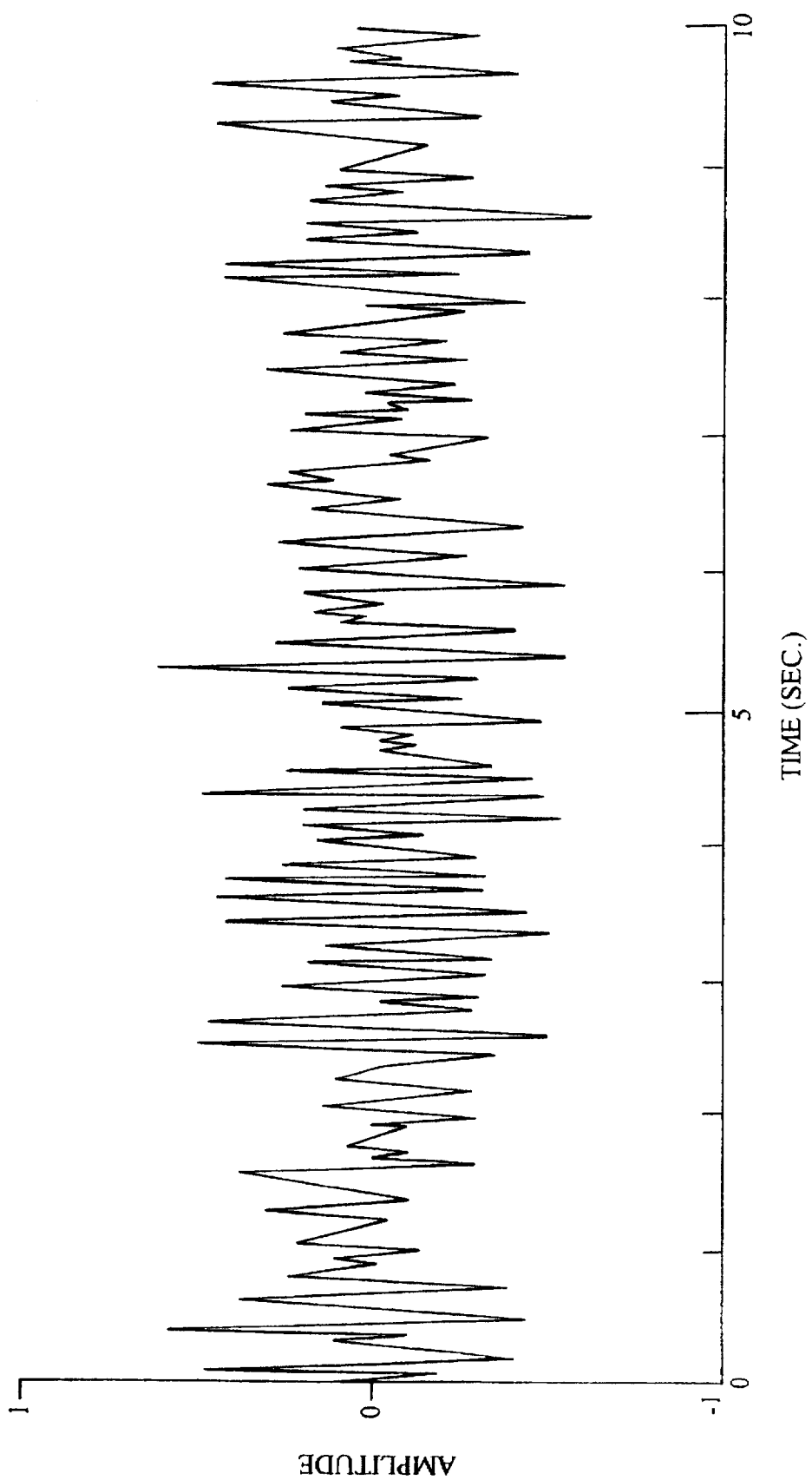

The propagated wave shown in FIGS. 1 and 2 includes both short-period seismic surface waves and long-period seismic waves. Short-period seismic waves are characterized by frequencies in excess of approximately 1 hz while long-period seismic waves are characterized by frequencies which range from substantially 0 hz to 0.01 hz. FIG. 4a is a graph (amplitude vs. time) which depicts long-period seismic waves and FIG. 4b is a similar graph of short-period seismic waves, both of which are detected by the apparatus and method of the present invention.

FIG. 2 illustrates the apparatus of the present invention installed in the vicinity of a tornado to warn the occupants of a building, in the path of the tornado, of an approaching tornado. The apparatus is shown to include detectors mounted in contact with the ground and disposed to detect both long-period and short-period seismic waves which typically precede an oncoming tornado. The detectors may include a long-period detector 2 such as Applied Geomechanics Model 755 tiltmeter, or such as Crossbow CXTA analog tilt sensor, to detect long-period seismic waves. To detect the short period seismic waves a short-period detector 3, such as Mark Product Model L-10 velocity transducer, or Analog Device ADXL105 accelerometer may be used. The detectors are shown in separate housings; however, it is to be understood that the detector may be incorporated in a single housing, if desired. The housings (or housing) are placed in direct contact with the ground or, preferably, buried in the ground at a depth of less than one foot and are designed to detect seismic waves from a variety of sources. The minimum detection range for tornadoes is estimated to be one mile.

Figure 3:
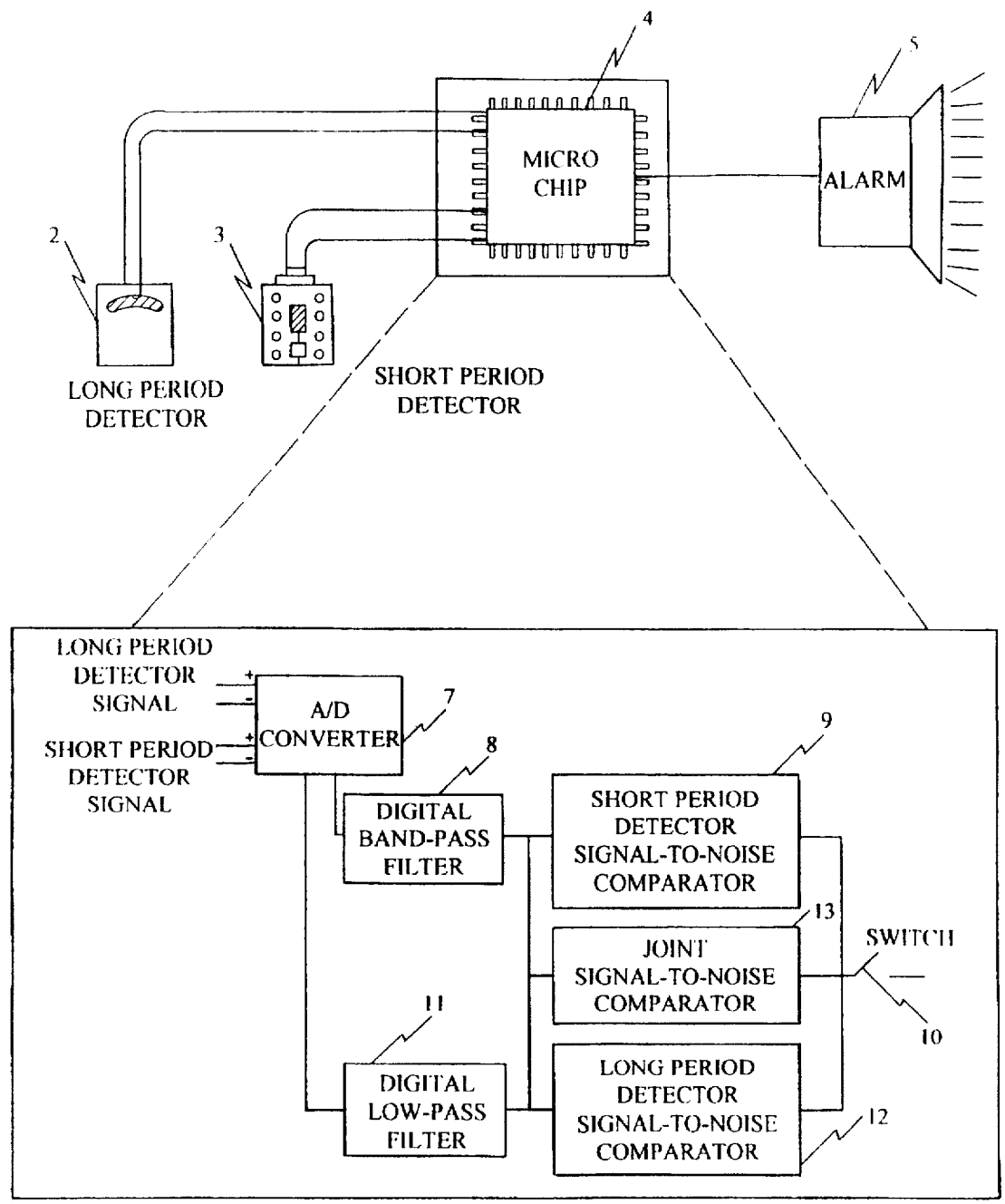
FIG. 3 is a block diagram of the warning system of the present invention.

As shown in FIG. 3, within a microchip 4, signals from the detectors 2 and 3 pass through an A/D converter 7. The output of the converter 7 from the short-period wave detector 3 passes through a filter 8 which screens out signals that are of a non-tornadic origin, such as due to blasting, ground transportation system, or lightning strikes. The filter 8 is a digital band-pass filter with a frequency band from substantially 1 to 60 hz involving a specific impulse response function. Such filters are well known in the art. Two typical band-pass filters are respectively disclosed on pages 239 and 262 of the book "Digital Signal Processing" by Alan V. Oppenheim et al, and published by Prentice Hall (1975). The output of the band-pass filter 8 passes through a short-period wave signal-to-noise comparator 9 which compares the magnitude of the filtered signal from the short-period wave detector 3 with a noise threshold magnitude.

Signals generated by the long-period wave detector 2, after passing through A/D converter 7 are directed to a digital low-pass filter 11. The digital low-pass filter 11 has a break frequency of substantially 0.01 hz involving a specific impulse response function. Such filters are well known in the art. Two typical low-pass filters are respectively disclosed on pages 291 and 308 of the book "Introduction to Digital Signal Processing" by Johnny R. Johnson and published by Prentice Hall (1989). After passing through filter 11, the signals are passed to a long-period wave signal-to-noise comparator 12 which compares the magnitude of the filtered long-period wave with a noise threshold magnitude.

The outputs from filters 8 and 11 are fed into a joint signal-to-noise comparator 13 which compares the magnitude of each filtered signal with a threshold magnitude.

If the signal-to-noise from any of the three signal-to-noise comparators exceeds a predetermined value, which is designed to keep the false alarm rate below 10%, a signal is generated by the joint comparator and sent to a switch 10, which is closed in a manner well known in the art. One such switch is described on pages 310–312"Microelectric Circuits" by Adel S. Sedra et al and published by Holt, Rinehart and Winston (Second Edition) and the switch 10 then directs the signal from the comparator to a commercially available alarm, such as Edmund Scientific Model K39, 094, for activation thereof.

Although the apparatus and method of the present invention are not capable of detecting tornadoes at so great a range as Doppler radar, it is the only known method for detecting when a tornado is in contact with ground. The warning time that it provides is sufficient to allow the occupants of a building to seek shelter in the safest location within the building where the invention is installed.

From the foregoing it will be apparent that the present invention provides a method and apparatus for detecting the seismic disturbances (vibrations and tilt) produced by a tornado in contact with the ground. Furthermore, the invention can discriminate between the seismic signal produced by a tornado and seismic signals produced by other sources such as blasting, ground transportation systems, and lightning strikes. Thus, the warning generated by the invention will be generally interpreted as a legitimate sign of imminent danger, requiring immediate action.

Although the invention has been disclosed herein as being a method and apparatus to provide a warning of an approaching tornado to the occupants of a building where the invention is installed, there are also alternative uses of this invention. Two alternative uses of the method and apparatus disclosed herein which fall within the scope of this invention, are as follows:

1. Method and apparatus for providing a warning of an approaching tornado to the occupants of a number of buildings near a central point of installation of the invention.

2. Method and apparatus for providing a warning of an approaching tornado to the residents of a geographical region within which a network of the inventions is installed.

We claim:

1. A tornado warning system having means for monitoring seismic waves of a predetermined frequency range including long-period seismic waves and short-period seismic waves, said seismic waves being associated with and produced in the ground as a result of an approaching tornado, said warning system comprising:

means for detecting said seismic waves including said long-period seismic waves and said short-period seismic waves and for providing an electrical output indicative thereof;

circuit means for processing said electrical output to provide an output signal indicative of said long-period seismic waves and said short-period seismic waves; and alarm means for receiving said output signal from said circuit means to provide an alarm to warn of the presence of a tornado.

2. Apparatus as in claim 1 wherein said long-period seismic waves are on the order of 0 to 0.01 hz.

3. Apparatus as in claim 1 wherein said short-period seismic waves are on the order of 1–60 hz.

4. Apparatus as in claim 2 wherein said means for detecting said long-period seismic waves is a tiltmeter.

5. Apparatus as in claim 2 wherein said means for detecting said long-period seismic waves is an analog tilt sensor.

6. Apparatus as in claim 3 wherein said means for detecting said short-period seismic waves is a velocity transducer.

7. Apparatus as in claim 3 wherein said means for detecting said short-period seismic waves is an accelerometer.

8. A tornado warning system having means for monitoring seismic waves of predetermined frequency ranges including long-period seismic waves and short-period seismic waves, said seismic waves being associated with and produced in the ground as a result of an approaching tornado, said warning system comprising:

detector means mounted in direct contact with the ground to receive seismic waves including said short-period and long-period waves produced in the ground as a result of an approaching tornado, said detector means disposed for providing electrical signals indicative of and responsive to said seismic waves;

filter means for receiving said electrical signals from said detector means and for attenuating said electrical signals that are not indicative of said seismic waves produced in the ground as a result of an approaching tornado. while passing said electrical signals indicative of said seismic waves of a predetermined frequency range that are produced in the ground as a result of an approaching tornado, said passed electrical signals having a signal-to-noise ratio;

signal-to-noise comparator means for comparing the magnitude of said passed electrical signals with a noise threshold magnitude;

an activation switch disposed for activation responsive to said signal-to-noise ratio exceeding said noise threshold magnitude; and an alarm device connected to said activation switch, said alarm device being actuated by said activation switch responsive to said signal-to-noise ratio exceeding said threshold magnitude.

9. Apparatus as in claim 8 including an analog-to-digital converter for receiving said electrical signals from said detector means to provide a digital output.

10. Apparatus as in claim 9 wherein said filter means includes a digital band-pass filter for passing frequencies in the short-period seismic wave range.

11. Apparatus as in claim 9 wherein said filter means includes a digital low-pass filter for passing frequencies in the long-period seismic wave range.

12. A tornado warning system having means for monitoring seismic waves of predetermined frequency ranges including long-period seismic waves and short-period seismic waves, said seismic waves being associated with and produced in the ground as a result of an approaching tornado, said warning system comprising:

a short-period seismic wave detector means and a long-period seismic wave detector means disposed in contact with the ground to receive seismic waves including said short-period seismic waves and long-period seismic waves produced in the ground as a result of an approaching tornado, said long-period seismic wave detector means and said short-period seismic wave detector means disposed for providing analog electrical signals indicative of and responsive to said seismic waves;

an analog-to-digital converter for converting said analog electrical signals to digital signals;

digital band-pass filter means for receiving the short-period seismic wave digital signals from said short-period seismic wave detector means and for attenuating said digital signals that are not indicative of said short-period seismic waves produced in the ground as a result of an approaching tornado, while passing said digital signals indicative of said short-period seismic waves of a predetermined frequency range that are produced in the ground as a result of an approaching tornado, the passed short-period seismic wave digital signals having a short-period signal-to-noise ratio;

digital low-pass filter means for receiving the long-period seismic wave digital signals from said long-period seismic wave detector means and for attenuating said digital signals that are not indicative of said long-period seismic waves produced in the ground as a result of an approaching tornado while passing said digital signals indicative of said long-period seismic waves of a predetermined frequency range that are produced in the ground as a result of an approaching tornado, the passed long-period seismic wave digital signals having a long-period signal-to-noise ratio;

a short-period seismic wave signal-to-noise comparator electrically connected to said digital band-pass filter for comparing the magnitude of said passed short-period seismic wave digital signals with a first noise threshold and for providing an electrical output responsive to the magnitude of said passed short-period seismic wave digital signals exceeding said first noise threshold;

a long-period seismic wave signal-to-noise comparator electrically connected to said digital low-pass filter for comparing the magnitude of said passed long-period seismic wave digital signals with a second noise threshold and for providing an electrical output responsive to the magnitude of said passed long-period seismic wave digital signals exceeding said second noise threshold;

a joint signal-to-noise comparator electrically connected to said digital band-pass filter and said digital low-pass filter for comparing the magnitude of the combination of said passed short-period seismic wave digital signals and said passed long-period seismic wave digital signals with a third noise threshold and for providing an electrical output responsive to the magnitude of said combination of passed short-period seismic wave digital signals and passed long-period seismic wave digital signals exceeding said third noise threshold;

an activation switch electrically connected to all three signal-to-noise comparators, said switch being closed responsive to receiving said electrical output signal from any one of said signal-to-noise comparators;

an alarm device connected to said activation switch, said alarm device being actuated by said activation switch responsive to said electrical output from any one of said signal-to-noise comparators.

13. A method of providing warning signals of an approaching tornado comprising:

Locating short-period seismic wave and long-period seismic wave detection means in direct contact with the ground to detect seismic waves including short-period seismic waves and long-period seismic waves of predetermined frequencies produced in the ground as a result of an approaching tornado, said detection means disposed for generating electrical signals indicative of said short-period seismic waves of predetermined frequencies that are produced in the ground as a result of an approaching tornado; and for generating electrical signals indicative of said long-period seismic waves of predetermined frequencies that are produced in the ground as a result of an approaching tornado;

providing a band-pass filter means remotely from said detection means, said band-pass filter means disposed for receiving said electrical signals indicative of said short-period seismic waves from said detection means, and, for attenuating substantially all of the electrical signals except said electrical signals indicative of said short-period seismic waves produced in the ground as a result of an approaching tornado, said electrical signals indicative of said short-period seismic waves produced in the ground as a result of an approaching tornado having a short-period seismic wave signal-to-noise ratio;

comparing the magnitude of said short-period seismic wave signal-to-noise ratio of said signals indicative of said short-period seismic waves to a first threshold magnitude;

providing a low-pass filter means remotely from said detector means, said low-pass filter means disposed for receiving said electrical signals indicative of said long-period seismic waves and for attenuating substantially all of said electrical signals except said electrical signals indicative of said long-period seismic waves produced in the ground as a result of an approaching tornado, said electrical signals indicative of said long-period seismic waves produced in the ground as a result of an approaching tornado having a long-period seismic wave signal-to-noise ratio distinct from that for the short-period signal;

comparing the magnitude of said long-period seismic wave signal-to-noise ratio of said signal indicative of said long-period seismic waves to a second threshold magnitude;

comparing jointly the magnitudes of said long-period and said short-period seismic waves with a third threshold level; and activating an alarm when said short-period seismic wave signal-to-noise ratio exceeds said first threshold level, or said long-period seismic wave signal-to-noise ratio exceeds said second threshold magnitude or when said signal-to-noise level exceeds said third threshold level.

14. The method of claim 13 including the step of converting said electrical signals from said detector means into digital signals.

15. The method of claim 14 wherein said detector means is located a predetermined distance below the surface of the ground.

16. The method of claim 15 wherein said predetermined distance is approximately one foot below the ground surface.

17. The method of claim 16 wherein said predetermined frequencies are in the 1–60 hz range for the short-period seismic wave signal and 0 to 0.01 hz for the long-period seismic wave signal.

* * * * *